Patented Dec. 13, 1938

2,139,758

UNITED STATES PATENT OFFICE 2,139,758

LUBRICANT AND LUBRICATION THEREWITH

Arthur Walther Lewis, Elizabeth, N. J., assignor to Tide Water Associated Oil Company, Bayonne, N. J., a corporation of Delaware No Drawing. Application December 8, 1936,
Serial No. 114,768

10 Claims. (Cl. 87—9)

This invention relates to lubricants intended for service in the lubrication of internal combustion engines. The invention more particularly is concerned with lubricating or motor oils of mineral hydrocarbon origin which are normally corrosive toward bearing metal alloys of the character of cadmium-silver, cadmium-nickel, or copper-lead; and has, for an important objective, the inhibition or prevention of deterioration of such bearing metal in service by the corrosive action of the lubricant thereon.

Engine bearings comprising or surfaced with cadmium-silver or like alloys now are frequently employed in lieu of the more usual Babbitt metal bearings, in order to cope with extreme service conditions of friction and temperature. These conditions are the consequences of modern developments in internal combustion engines making available high sustained speeds and requiring bearings formed of metals or alloys having greater resistance to wear, and further characterized by higher melting points necessary to prolonged life under the extreme thermal conditions existing during operation of the engine. Temperatures at the bearing surfaces during operation are much higher in the case of engines requiring these new bearings than formerly was the circumstance with engines in which Babbitt metal bearings gave satisfactory service.

Experience with bearings of the character or type exemplified by cadmium-silver, cadmium-nickel and copper-lead alloys has demonstrated, however, that their utility is greatly impaired by an extreme susceptibility to rapid deterioration by the corrosive action or effect of many available lubricating oils. Particularly has this effect been noted when the oils are of the character generally regarded as superior lubricants by conventional criteria.

Little is known concerning the nature of the corrosive action or its causes; but in general it has been observed that motor oils derived from selected crudes predominantly paraffinic in origin, as well as those oils from these or other crudes which have been improved by treatment with selective solvents, exhibit a marked tendency toward corrosion of the bearings in question, although by other tokens the lubricant is of superior quality. Oxidation stability, as indicated by sludge or acid formation in conventional tests indicative of the tendency toward deterioration of the oil itself in service, does not appear to have reliable correlation with the tendency of the oil to corrode bearing surfaces. It is possible that the high bearing surface temperatures existing under service conditions with the new bearings may be a factor in occasioning the observed deleterious effect of motor oils thereupon. It would appear, also, that the problem of bearing corrosion, with which the present invention is particularly concerned, contrasts with problems of lubricant deterioration per se, since oils characterized by long life and good stability may be just as corrosive as those of interior grade. No theory in explanation of the observed corrosive action or the prevention thereof, as herein proposed according to the invention, is intended to be relied upon.

According to the present invention, it has now been found that the corrosive effect of lubricating oils upon bearing surfaces of the character referred to above may be avoided in novel and effective manner by incorporating with such oils particular compounds having a retarding or inhibiting effect in respect of such corrosion. More specifically, the invention arises from the discovery that a compound comprising thio benzanilide effects a very beneficial retardation of the corrosive action of internal combustion engine lubricating oils upon cadmium-silver, cadmium-nickel, copper-lead and like bearing metal alloys.

It is, therefore, an important object of the present invention to inhibit or retard the corrosive deterioration of cadmium-silver and like bearing metal alloys in automotive service by providing a lubricant therefor comprising a refined mineral hydrocarbon oil having incorporated therewith thio benzanilide in small but effective proportion. Likewise, it is an object of the invention to improve, and to prepare improved, motor oils of petroleum origin by incorporating therein thio benzanilide in corrosion inhibiting proportions. The provision of an inhibitor effective for such purpose and comprising the aforementioned compound naturally is a major objective.

Viewed in another aspect, the invention may be regarded as encompassing a novel method of lubricating bearing metal surfaces, of the character of cadmium-silver, cadmium-nickel, copper-lead or like alloys, by applying thereto a film of lubricant comprising mineral hydrocarbon oil having incorporated therewith a small but effective proportion of thio benzanilide. With this method of lubrication it has been found that prolonged life and consequent improved service may be attained in the use of these alloys as bearing metals for internal combustion engines, particularly when operating conditions such as high sustained speeds under load occasion unusually high bearing surface temperatures. Ordinarily, the oil selected for use, in applying the lubricating method of the invention to its intended service, will be of a character generally regarded as of superior grade and refining. Thus, the invention finds particular utility in making possible the beneficial use of such oils by avoiding deleterious consequences otherwise encountered when no preventive measures are taken against the corrosive deterioration of bearing metal alloys as hereinbefore referred to. It will be understood, however, that the invention contemplates no limitation in this respect, and that the method of lubrication herein described may be practiced in conjunction with mineral hydrocarbon lubricating oils taken as a broad class and regardless of origin.

Thio benzanilide is a compound conforming to the structural formula

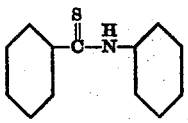

Solubility in mineral hydrocarbon oil of motor lubricating oil character is limited, but the proportion necessary to accomplish the objects of the present invention is well within the limits of solubility. It suffices, therefore, simply to dissolve thio benzanilide (if desired with moderate application of heat to facilitate solution) in motor oil intended for service in internal combustion engines in order to prepare for the lubrication thereof according to the invention. Proportions as low as 0.2% by weight of the compound dissolved in motor oil are shown by the illustrative data hereinafter presented to be markedly inhibitive of the corrosion normally attending the use of many lubricating oils with bearing metals of the type comprising cadmium-silver and like alloys. The stated percentage is not intended as a limitation upon the contemplated scope and practice of the invention, as obviously the inhibitor may be, and is intended to be, employed in any corrosion inhibiting proportion.

Actual operation of an internal combustion engine lubricated according to the invention was used to demonstrate the efficacy of thio benzanilide as an inhibitor of bearing corrosion. The tests were run in an eight cylinder automobile engine equipped with connecting-rod bearings of the newer type exemplified by the alloys mentioned above; and operated under carefully controlled conditions duplicated in successive runs with and without inhibitor present in the lubricating oil. New bearings carefully weighed were used for each run, and each set comprised alternate cadmium-silver and copper-lead bearings respectively. Operating conditions included an engine speed of 2850 R. P. M. under a load of 50 brake horsepower and a running period of 15 hours, this being the equivalent of 768 miles travel at a speed of 51.2 miles per hour. Crankcase oil temperature was maintained at 300° F. and water temperature at 200° F. The oil consequently was subjected to lubricating service far more severe than that normally to be encountered in ordinary automotive use. At the end of each run the bearings were removed and again weighed, the loss in weight giving a measure of corrosion caused by the lubricant.

The test method described above is carried out in the familiar Underwood corrosion apparatus supplied by the Scientific Instrument Company of Detroit, Michigan, in accordance with General Motors specifications.

Tested in an engine under the foregoing conditions an S. A. E. 20 motor oil, comprising a blend of solvent refined Pennsylvania neutral oil with a conventionally produced Pennsylvania bright stock and having an A. P. I. gravity of 30.1, Saybolt viscosity @ 100° F. of about 300 seconds, Saybolt viscosity @ 210° F. of 54 seconds and flash point of 425° F., gave the following results:

| Inhibitor | Milligrams loss in weight per bearing | |
|---|---|---|
|  | Cd-Ag | Cu-Pb |
| None | 3,782 | 467 |
| 0.2 percent thiobenzanilide | 257 | 85 |

The foregoing results obtained in exploratory practice of the invention under service conditions of accentuated severity clearly evidence the operative significance of thiobenzanilide as a valuable addition to motor oils intended for service in the lubrication of engines equipped with cadmium-silver and like alloy bearings. Inspection of the comparative data presented in the above table shows a substantially complete suppression of corrosion when the inhibitor is used in proportions of 0.2%. However, for many circumstances of normal automotive use it is likely that smaller percentage of inhibitor will suffice since operating conditions ordinarily encountered are not as stringent as those of the test runs herein.

The tendency of motor oils to corrode bearings of the character in question likewise may be determined by another test which affords a ready method of obtaining a comparative evaluation of motor oils in the laboratory. In this test method a group of bearings, ordinarily including at least one each of several of the newer bearing metal alloys (viz: cadmium-silver, cadmium-nickel and copper-lead) is supported in a chamber in which air may circulate and the bearing surfaces are exposed for a period of 22 hours to a stream of oil sprayed under pressure continuously upon the corrodible area. The oil is maintained at a temperature of 335° F. to 350° F. and the spray is so directed as to disperse the oil over the surfaces of the bearings. Means are provided for re-circulating the sprayed oil so that a given quantity is used for a given test, thus simulating service conditions in an engine. The measure of corrosion is taken as the loss in weight of the bearing per unit of exposed corrodible surface.

Results obtained utilizing the foregoing test for comparative evaluation of motor oils with and without thiobenzanilide provide further specific illustration of the value and inhibiting effectiveness of this compound. The oil used was the same as that hereinbefore described in connection with the reported engine tests, the inhibitor added in proportion of 0.2% by weight, and cadmium-silver, cadmium-nickel, and copper-lead bearings all were present during each run. Comparative losses in weight per square decimeter due to corrosion were as follows for the respective bearings:

| Bearing | Oil blank | Oil plus thiobenzanilide |
|---|---|---|
|  | Grams |  |
| Cadmium-silver | 10.5 | No loss. |
| Cadmium-nickel | 10.1 | Do. |
| Copper-lead | 8.5 | Do. |

While the utility of the invention has been illustrated specifically with reference to a particular motor oil, no limitation is to be inferred therefrom, and other oils, whether or not comparable in specification or origin, may be used in the lubrication of bearings of the type described in accordance with the invention.

I claim:

1. The method of lubricating bearings having substantially the corrosion susceptibility characterizing cadmium-silver, cadmium-nickel and copper-lead, alloys, which consists in applying to the bearing surfaces lubricant comprising mineral hydrocarbon oil of a character normally tending to corrode said bearing surfaces and having incorporated therein thio benzanilide in proportion effective to inhibit corrosion of said bearing surfaces during the lubrication thereof.

2. The method of claim 1, further characterized in that the added thio benzanilide is incorporated with the lubricant in proportions of the order of 0.2% by weight.

3. The method of lubricating bearing surfaces in internal combustion engines, which bearing surfaces comprise an alloy having substantially the corrosion susceptibility characterizing cadmium-silver, cadmium-nickel, and copper-lead alloys, which consists in applying to said bearing surfaces lubricant comprising mineral hydrocarbon oil of a character normally tending to corrode said bearing surfaces and having incorporated therein corrosion inhibiting proportions of thio benzanilide.

4. The method of lubricating bearing surfaces in internal combustion engines, which bearing surfaces comprise an alloy having substantially the corrosion susceptibility characterizing cadmium-silver, cadmium-nickel, and copper-lead alloys, which consists in applying to said bearing surfaces lubricant comprising mineral hydrocarbon oil of a character normally tending to corrode said bearing surfaces and having incorporated therein 0.2% by weight of thio benzanilide.

5. In the lubrication of bearing surfaces, one of which is formed of an alloy having substantially the corrosion susceptibility characterizing cadmium-silver, cadmium-nickel, and copper-lead alloys, with mineral hydrocarbon oil normally tending to cause substantial and rapid corrosion thereof, the method of inhibiting such corrosion which comprises incorporating with said oil corrosion inhibiting proportions of thio benzanilide.

6. In the lubrication of bearing surfaces, one of which is formed of an alloy having substantially the corrosion susceptibility characterizing cadmium-silver, cadmium-nickel, and copper-lead alloys, with mineral hydrocarbon oil normally tending to cause substantial and rapid corrosion thereof, the method of inhibiting such corrosion which comprises incorporating with said oil thio benzanilide in proportions of about 0.2% by weight.

7. Mineral oil composition, comprising a hydrocarbon lubricating oil of motor oil character normally tending to corrode the type of bearing metal having substantially the corrosion susceptibility characterizing cadmium-silver, cadmium-nickel and copper-lead alloys when continuously applied to the surface thereof for an extended period of time at an oil temperature of 335° F., and thio benzanilide incorporated with said oil in corrosion inhibiting proportions.

8. Mineral oil composition, comprising a hydrocarbon lubricating oil of motor oil character normally tending to corrode the type of bearing metal having substantially the corrosion susceptibility characterizing cadmium-silver, cadmium-nickel and copper-lead alloys when continuously applied to the surface thereof for an extended period of time at an oil temperature of 335° F., and thio benzanilide incorporated with said oil in proportions of about 0.2% by weight.

9. A lubricant for the lubrication of internal combustion engines operating at high sustained speeds and employing bearings presenting bearing surfaces of an alloy selected from the class of cadmium-silver, cadmium-nickel, and copper-lead alloys, which comprises a well-refined mineral lubricating oil of the character normally effective to cause substantial corrosion of such bearing surfaces, and added thio benzanilide incorporated with said oil in corrosion inhibiting proportions.

10. Mineral oil composition, comprising a hydrocarbon lubricating oil of a character normally tending to corrode the type of bearing metal having substantially the corrosion susceptibility characterizing cadmium-silver, cadmium-nickel and copper-lead alloys when continuously applied to the surface thereof under service conditions, and thio benzanilide incorporated with said oil in corrosion inhibiting proportions.

ARTHUR WALTHER LEWIS.